United States Patent
Cejka et al.

(10) Patent No.: US 7,571,219 B2
(45) Date of Patent: Aug. 4, 2009

(54) PRESERVING AND ACCESSING ACTIVE COMPONENTS IN WEB PAGES

(75) Inventors: Hans-Peter Cejka, Walldorf (DE); Jens Steckhan, Karlsruhe (DE)

(73) Assignee: SAP AG, Walldorf (DE)

( * ) Notice: Subject to any disclaimer, the term of this patent is extended or adjusted under 35 U.S.C. 154(b) by 957 days.

(21) Appl. No.: 11/015,618

(22) Filed: Dec. 16, 2004

(65) Prior Publication Data

US 2006/0168540 A1   Jul. 27, 2006

(51) Int. Cl.
*G06F 15/16* (2006.01)
(52) U.S. Cl. .................. 709/219; 719/313
(58) Field of Classification Search .......... 709/219
See application file for complete search history.

(56) References Cited

U.S. PATENT DOCUMENTS

| | | | |
|---|---|---|---|
| 6,636,863 B1* | 10/2003 | Friesen | 707/102 |
| 6,785,891 B1* | 8/2004 | Allen et al. | 719/313 |
| 6,990,534 B2* | 1/2006 | Mikhailov et al. | 709/250 |
| 7,162,717 B1* | 1/2007 | Harris | 717/168 |
| 7,299,409 B2* | 11/2007 | Joshi et al. | 715/234 |
| 2002/0178007 A1* | 11/2002 | Slotznick et al. | 704/270.1 |
| 2003/0058271 A1* | 3/2003 | Van Der Meulen | 345/738 |
| 2005/0138183 A1* | 6/2005 | O'Rourke et al. | 709/228 |

\* cited by examiner

*Primary Examiner*—Patrice Winder
*Assistant Examiner*—Vivek Krishnan
(74) *Attorney, Agent, or Firm*—Finnegan, Henderson, Farabow, Garrett & Dunner L.L.P.

(57) ABSTRACT

Systems, methods, and computer program products, implementing techniques for preserving and accessing active components in web pages. In one aspect, active components running in a web browser are not terminated when the surrounding web page is unloaded by the web browser. In another aspect, active components running in a web browser can be accessed and modified by server-side applications running on a web server.

12 Claims, 6 Drawing Sheets

```
<HTML>
    <BODY>
        ...
        <OBJECT>
            ...
            <PARAM NAME="key" VALUE="k">           220

<PARAM NAME="innerClassID" VALUE="123">    230
            ...
        </OBJECT>
        ...
    </BODY>
</HTML>
```
210 braces the <OBJECT>...</OBJECT> block.

FIG. 2

PRESERVING AND ACCESSING ACTIVE COMPONENTS IN WEB PAGES

BACKGROUND

The present invention relates to data processing by digital computer, and more particularly to preserving and accessing active components in web pages.

A web page is a document sent by a web server to a web browser in response to a request from the web browser. One protocol used for such communication is HTTP (Hypertext Transfer Protocol).

A web page can include one or more programs that execute in the web browser once the web page has been loaded by the web browser. The programs can perform tasks on the web page. For example, the programs can display animations, perform calculations, or validate user input. Such programs will be referred to as active components. Active X controls and Java applets are examples of active components.

Typically, it is not possible for a web server to make calls to active components running in a web browser. Also, when a web browser loads a web page, any active components in the web page are instantiated by the web browser and run in the web browser. Subsequently, when the web browser is preparing to load a new web page, any active components currently running in the web browser are terminated by the web browser before the new web page is loaded. Even if the new web page includes the same active component as the previous web page, the web browser still terminates the active component and re-instantiates the active component when the new web page is loaded.

SUMMARY OF THE INVENTION

The present invention provides systems, methods, and computer program products, implementing techniques for preserving and accessing active components in web pages.

In one aspect, the techniques include receiving a request from a web browser for a web page, invoking a server-based application to generate the web page, the server-based application being an application that runs on the web server, receiving from the server-based application a method call to be invoked on an active component running in the web browser, generating call data that describes the method call to be invoked, adding the call data to the web page generated by the server-based application, and sending the web page including the call data to the web browser. The active component is a program that executes in the web browser and that is persistent.

Implementations can include one or more of the following features.

The active component is an active inner component that is held by an active outer component.

In another aspect, the techniques include receiving a request from a web browser for a first web page, and in response, sending the first web page to the web browser. The first web page includes a markup element that specifies an active outer component. The markup element includes a first parameter that stores a unique identifier for an active inner component and a second parameter that identifies a class name for the active inner component. The active outer component and the active inner component are programs that execute in the web browser.

Implementations can include one or more of the following features.

The active outer component, when instantiated in the web browser, is operable to instantiate a new active inner component using the class name stored in the second parameter and store a reference to the new active inner component in a static memory for the active outer component.

The active outer component is further operable to, before instantiating the new active inner component, use the unique identifier stored in the first parameter to look for an existing active inner component, and if an existing active inner component is found, use the existing active inner component instead of instantiating a new active inner component.

The first web page includes a script that is triggered when the web browser makes a request to load a second web page, the script being operable to cause the web browser, before un-loading the first web page from a visible frame of the web browser, to load the second web page in a hidden frame of the web browser and then switch the visibility of the frames so that the hidden frame becomes visible and the visible frame becomes hidden.

The second web page includes a markup element that specifies the same active outer component as the first web page, and the active outer component is instantiated when the second web page is loaded.

In another aspect, the techniques include making a request to a web server for a first web page, the first web page including an active outer component, receiving the first web page from the web server, loading the first web page in the web browser, including creating a first instance of the active outer component, making a request to the web server for a second web page, receiving the second web page from the web server, and before destroying the first web page, loading the second web page including creating a second instance of the active outer component. The second web page includes the same active outer component as the first web page. The first instance of the active outer component, instantiates an active inner component. The second instance of the active outer component looks for an existing active inner component and if an existing active inner component is found, uses the existing active inner component instead of instantiating a new active inner component.

Implementations can include one or more of the following features.

The first web page is loaded in a visible frame of the web browser.

The second web page is loaded in a hidden frame of the web browser,

The techniques further include, once the second web page is loaded in the hidden frame, switching the visibility of the frames so that hidden frame becomes visible and the visible frame becomes hidden.

In another aspect, the techniques include invoking a server-based application to generate the web page, receiving from the server-based application a method call to be invoked on an active component running in the web browser, generating call data that describes the method call to be invoked, adding the call data to the web page generated by the server-based application, and sending the web page including the call data to the web browser. The active component is a program that executes in the web browser. The server-based application is an application that runs on a web server.

Implementations can include one or more of the following features.

The call data is represented in XML (Extensible Markup Language) format.

The active component is an ActiveX control or Java applet.

In another aspect, the techniques include establishing connection with a web server, making a request to the web server for a web page, receiving the web page from the web server, the web page including call data that describes a method call to be invoked on an active component running in the web browser, performing the method call on the active component, generating results data from outputs generated by the method call, and sending the results data to the web server. The active component is a program that executes in the web browser.

Implementations can include one or more of the following features.

The results data is represented in XML (Extensible Markup Language) format.

The active component is an ActiveX control or Java applet.

The invention can be implemented to realize one or more of the following advantages. Active components running in a web browser are not terminated when the surrounding web page is unloaded by the web browser. Thus, the active components do not need to be re-instantiated. This is particularly advantageous in cases in where the active components display large amounts of data.

Active components can be accessed and modified by server-side applications running on a web server.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 2 illustrates an outer component.

Like reference numbers and designations in the various drawings indicate like elements.

DETAILED DESCRIPTION

Figure 1:
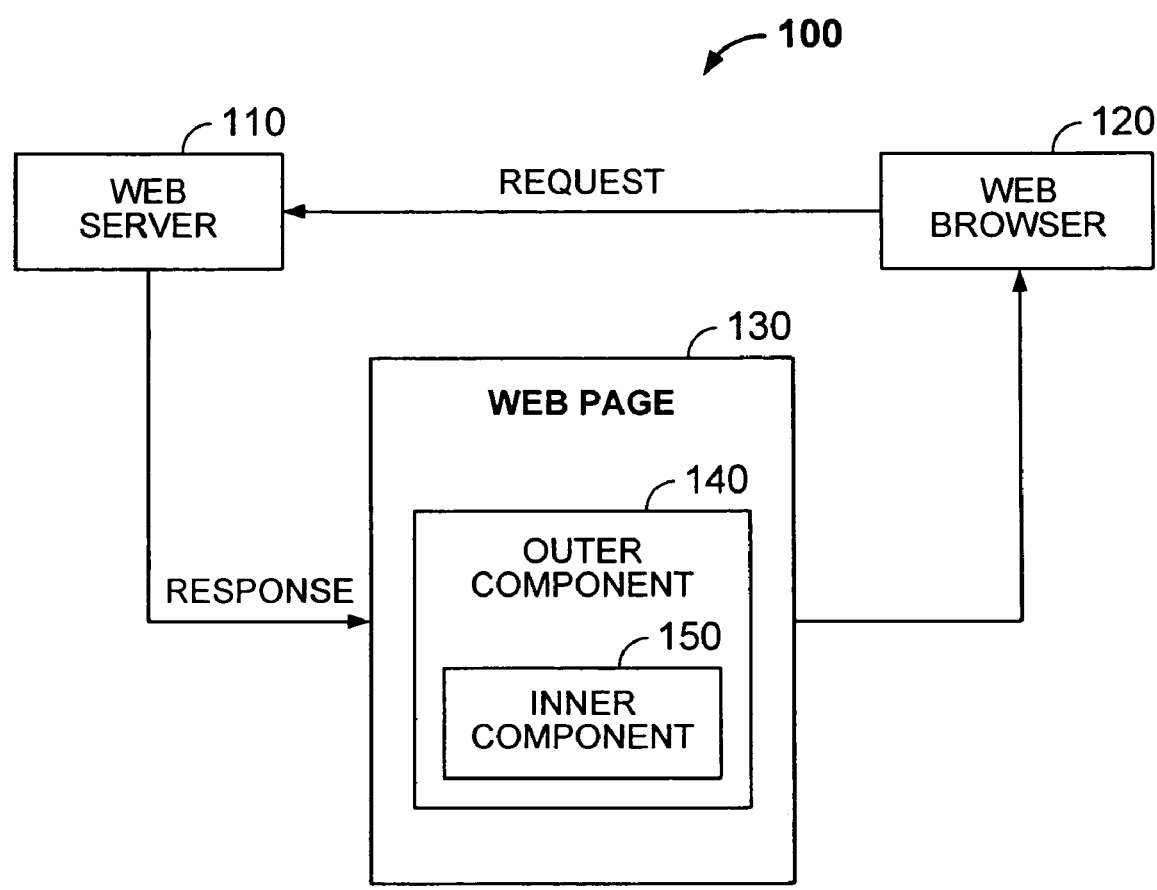
FIGS. 1 and 3 illustrate a system and method for preserving components in accordance with one implementation of the invention.

As illustrated in FIG. 1, a system 100 in accordance with one implementation of the invention includes a web server 110 and a web browser 120 in data communication with the web server 110. The web server 110 serves a web page 130 to the web browser 120 in response to receiving a request from the web browser 120 for the web page 130.

The web page 130 includes an active component 140 that will be referred to as an outer component 140 because this active component holds another active component 150, which will be referred to as an inner component 150. As will be described below, when the web page 130 is replaced by a new web page, the outer component is destroyed, but the inner component persists.

As shown in FIG. 2, the web page 130 is written in a markup language, generally, HTML (Hypertext Markup Language) or XML (Extensible Markup language). The markup includes a markup element 210 that specifies the outer component 140. The markup element 210 can include a key parameter 220 that stores a unique identifier for an inner component 150 and a class name parameter 230 that identifies the type (class name) of the inner component 150.

The outer component 140 is generic, meaning that it can hold any type of inner component 150. The parameters for the outer component 140 specify the particular type of inner component 150 being held.

Figure 3:
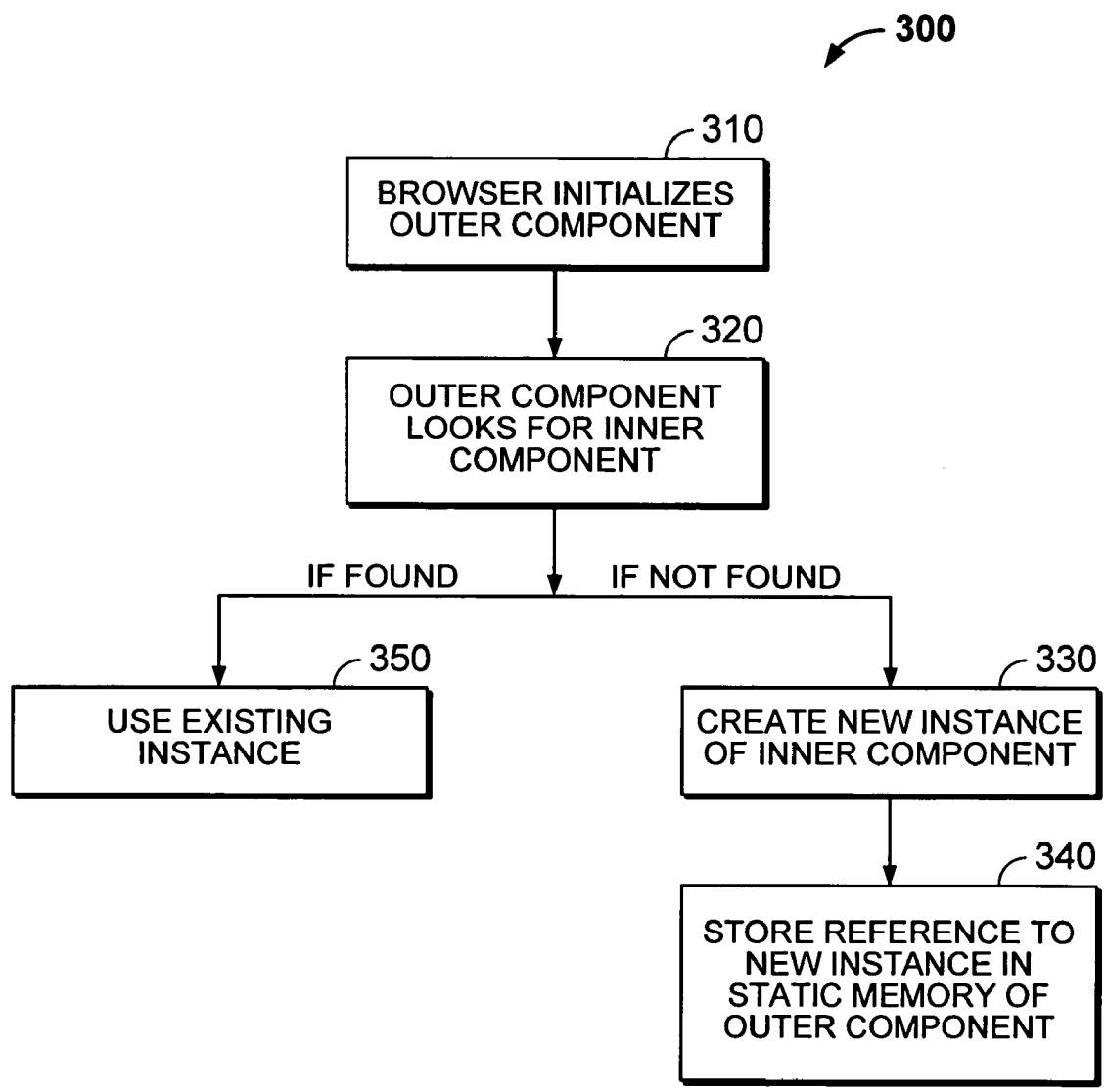

As illustrated in FIG. 3, when the web page 130 is loaded by the web browser, the web browser instantiates the outer component 140 (step 310). When the outer component 140 is instantiated, the outer component 140 reads the unique identifier for the inner component 150 from the key parameter 220 and searches in the static memory of the outer component 140 for a reference to the identified inner component 150 (step 320).

If the reference is not found, then the outer component 140 reads the class name of the inner component 150 from the class name parameter 230, creates a new instance of the inner component 150 (step 330) and stores a reference to the inner component 150 in the static memory of the outer component 140 (step 340). The inner component 150 does not appear in the document object model (DOM) for the web page 130 and therefore the inner component 150 is not visible to the web browser 120 and will not be destroyed by the web browser 120 when the web browser 120 unloads the web page 130.

Otherwise, if the reference is found, then the outer component 140 uses the inner component 150 that has been found instead of instantiating a new inner component 150 (step 350).

Subsequent to the loading of the web page 130, it may become necessary for the web browser 120 to load a new web page, for example, in response to user interaction with the web page 130.

The request to load a new web page triggers the execution of a script on the web page 130. The script can be written in JavaScript, VisualBasicScript, or in any other client-side scripting language.

Figure 4A:
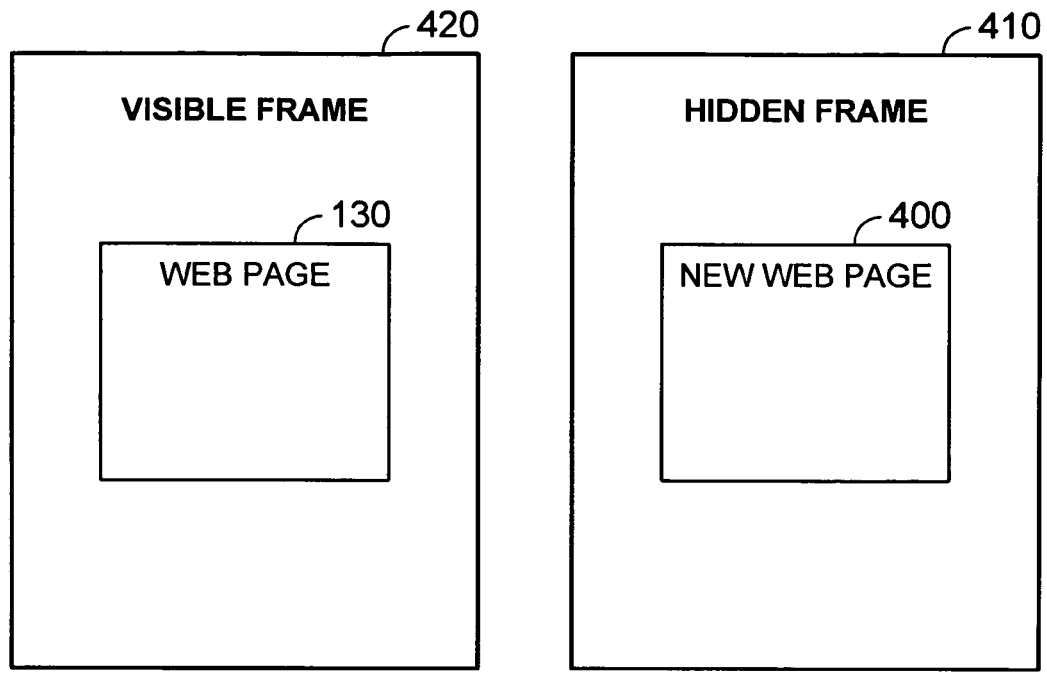
FIGS. 4A and 4B illustrate use of a hidden frame.
Figure 4B:
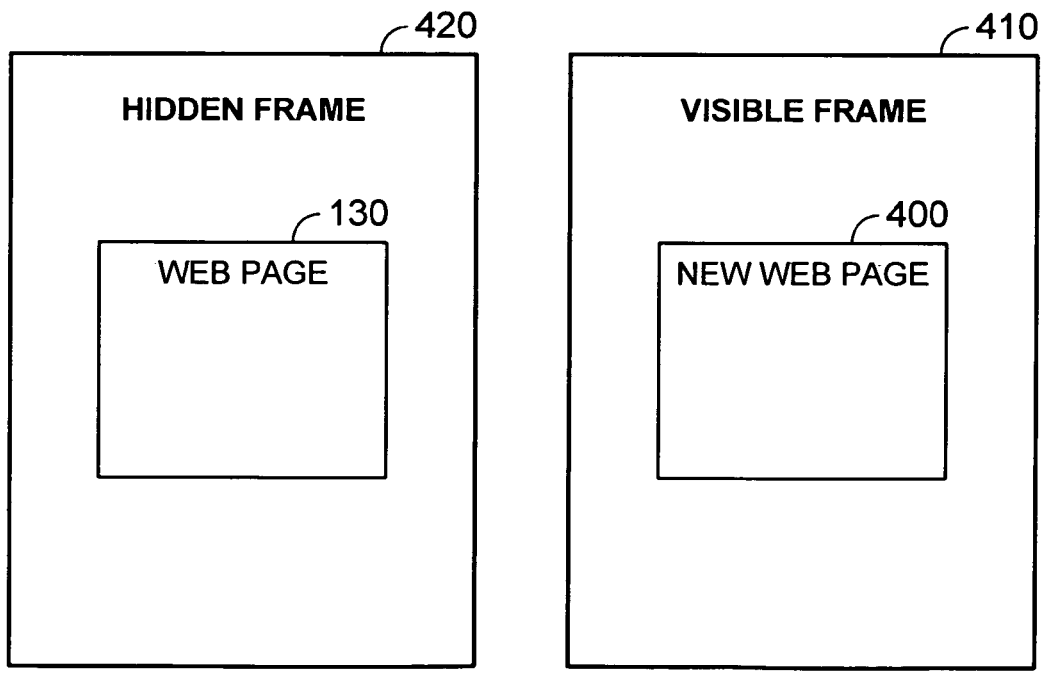

As shown in FIG. 4A, the script causes the new web page 400 to be loaded in a hidden frame 410 that is separate from the visible frame 420 in which the current web page 130 is displayed. If the new web page 400 also includes the same outer component 140 that was in the previous web page 130, then the browser instantiates a new instance of the outer component 140 as part of loading the new web page 400. Once the new web page 400 has finished loading in the hidden frame 410, the script switches the visibility of the two frames 410, 420, as shown in FIG. 4B, so that the previously hidden frame 410 now becomes visible and the previously visible frame 420 now becomes hidden.

The visibility of the frames 410, 420 can be switched by changing the size of the frame, for example, from 0% to 100%, or vice versa. Alternatively, the visibility of the frames 410, 420 can be switched by changing the location of the frame from a visible location within the browser window to a hidden location, or vice versa.

Once the visibility of the frames has been switched, the web browser 120, in accordance with conventional web browser behavior, destroys the web page 130 along with the instance of the outer component 140 that is running in the web page 130. As previously described, the inner component 150 is not destroyed by the web browser 120.

Although the instance of the outer component 140 is destroyed, the contents of the static memory of the outer component 140, including the reference to the inner component 150, persists. In accordance with conventional web browser behavior, the web browser 120 only destroys the static memory of an active component when there cease to be any instances of the active component running in the web browser 120. In the scenario illustrated in FIGS. 4A and 4B, because a new instance of the outer component 140 is created before the old instance of the outer component 140 is destroyed, there is never a point in time when there are no instances of the outer component 140 running in the web browser 120. Therefore, the contents of the static memory of the outer component 140, including the reference to the inner component 150, persists and the new instance of the outer component 140 is able to use the existing inner component 150 rather than create a new instance. In this manner, the inner component 150 does not need to be re-instantiated when the new page 400 is loaded.

The above-described techniques for preserving active components can be implemented using ActiveX technology, Java applet technology, or any other technology for developing active components. For Java applet implementations, the static memory of the outer component 140 can be part of the global static memory of the Java virtual machine. This allows the static memory of the outer component 140 to live as long as the web browser 120 lives.

Figure 5:
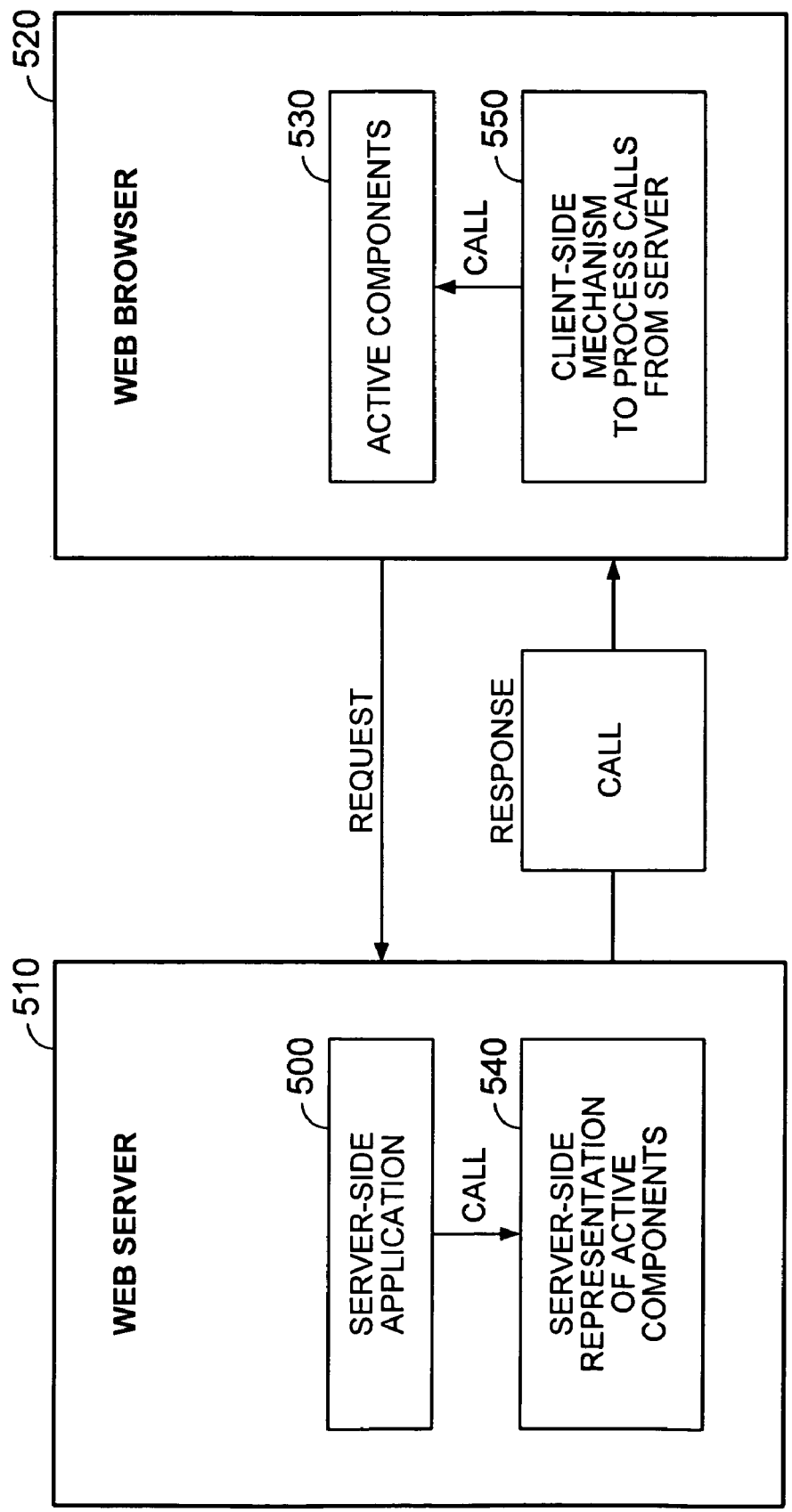
FIGS. 5 and 6 illustrate a system and method for accessing components in accordance with another implementation of the invention.

The following paragraphs describe a technique that allows a server-side application 500 (FIG. 5) running on a web server 510 to make calls to active components 530 running in a web browser 520. An example of a server-side application 500 is a servlet.

The web server 510 maintains a server-side representation 540 of the active components running in the web browser 520. Through this server-side representation 540, applications running on the web server 510 can make calls to the active components on the client side.

The web browser 520 includes a client-side mechanism 550 that processes these calls from the server, as will be further described below. The client-side mechanism 550 can be a client-side framework or a wrapper interface to the active components that handles the call data parsing and results data generation on behalf of the active components.

Figure 6:
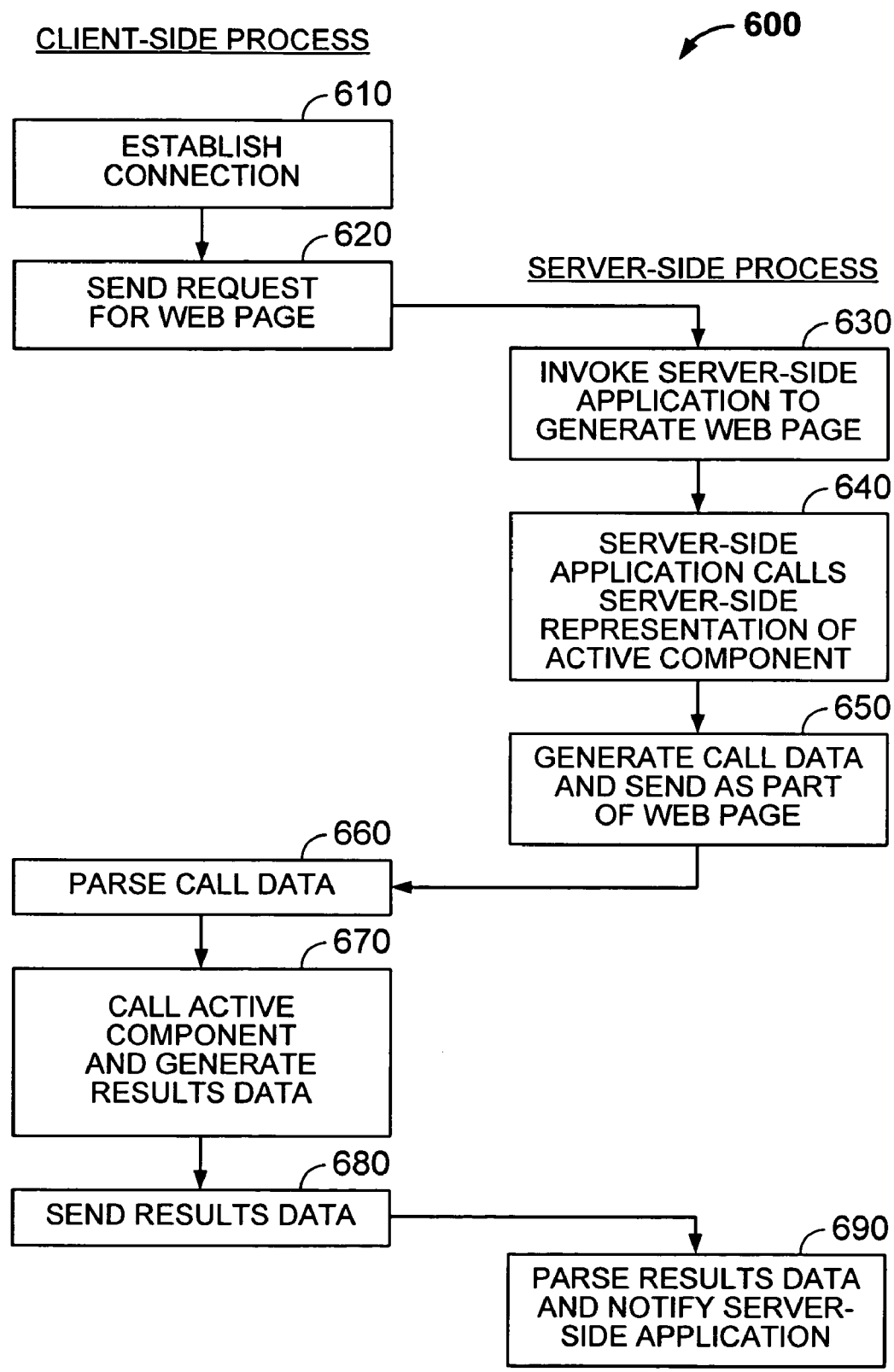

In a process 600 illustrated in FIG. 6, the web browser 520 establishes a connection with the web server 510 (step 610) and then sends a request to the web server 510 (step 620) for the web page 530. The web server 510 invokes the server-side application 500 to generate the requested web page 530.

During execution, the server-side application 500 calls a method on an active component running in the web browser 520 by calling the server-side representation 540 of the active component being called (step 630).

The server-side representation 540 is used to generate call data that identifies the method call and sends the call data to the web browser 520 as part of the web page 530 generated by the application 500 (step 640). The call data also identifies any parameter values to be passed when calling the method. The call data can be represented in XML (extensible markup language) format.

On the web browser side, the client-side mechanism 550 receives the web page and parses the call data to identify the method being called and the parameter values being passed (step 650). The client-side mechanism 550 then calls the identified method on the active component and generates results data that describes the results of the method call, for example, return values, error messages or both. (step 660). The results data can be represented in XML format. The client-side mechanism 550 then sends the results data back to the server-side representation 540 (step 670). The client-side mechanism 550 can send the results data back immediately, or alternatively, the client-side mechanism 550 can wait and send the results data back during the next request-response cycle that occurs.

Back on the server side, the server-side representation 540 parses the results data to determine the method results and then notifies the calling application 500 of the method results (step 680). This notification can be performed by triggering an event within the calling application 500.

The above-described techniques for calling methods on the active components can also be used for setting and getting attributes of the active components. These techniques for accessing active components can be used independently of the techniques for preserving components described earlier. The techniques can also be combined. For example, the active component that is called by the server-side application can be an active component that is persistent (i.e., an inner component that is wrapped in an outer component). The outer component can perform the functionality of the client-side mechanism 550 (i.e., parsing the call data, calling the method, and so on.)

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data web server), a middleware component (e.g., an application web server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and web servers. A client and web server are generally remote from each other and typically interact through a communication network. The relationship of client and web server arises by virtue of computer programs running on the respective computers and having a client-web server relationship to each other.

The invention has been described in terms of particular implementations, but other implementations can be implemented and are within the scope of the following claims. For example, the key and class name of the inner component can be passed through a script instead of through HTML parameters. Also, the reference to the inner component can be stored in other locations besides the static memory of the outer component. For example, the reference can be stored in another process on the client. In certain implementations, multitasking and parallel processing may be preferable. Other embodiments are within the scope of the following claims.

What is claimed is:

1. A computer program product, tangibly embodied in a computer-readable storage medium, the computer program product being operable to cause a computer to perform operations comprising:
 receiving a request from a web browser for a first web page; and
 sending, in response to the request, the first web page to the web browser, the first web page including:
 a markup element that specifies an active outer component, the markup element including a first parameter that stores a unique identifier for an active inner component and a second parameter that identifies a class name for the active inner component, the active outer component and the active inner component being programs that execute in the web browser, and
 a script that is triggered when the web browser makes a request to load a second web page, the script being operable to cause the web browser, before un-loading the first web page from a visible frame of the web browser, to load the second web page in a hidden frame of the web browser and then switch the visibility of the frames so that the hidden frame becomes visible and the visible frame becomes hidden.

2. The product of claim 1, wherein the active outer component, when instantiated in the web browser, is operable to:
 instantiate a new active inner component using the class name stored in the second parameter; and
 store a reference to the new active inner component in a static memory for the active outer component.

3. The product of claim 2, wherein the active outer component is further operable to:
 before instantiating the new active inner component, use the unique identifier stored in the first parameter to look for an existing active inner component; and if an existing active inner component is found, use the existing active inner component instead of instantiating a new active inner component.

4. The product of claim 1, wherein:
 the second web page includes a markup element that specifies the same active outer component as the first web page; and
 the active outer component is instantiated when the second web page is loaded.

5. A system comprising:
 means for receiving a request from a web browser for a first web page;
 means for sending, in response to the request, the first web page to the web browser; and
 a processor for implementing at least the means for sending,
 wherein the first web page includes:
 a markup element that specifies an active outer component, the markup element including a first parameter that stores a unique identifier for an active inner component and a second parameter that identifies a class name for the active inner component, the active outer component and the active inner component being programs that execute in the web browser, and
 a script that is triggered when the web browser makes a request to load a second web page, the script being operable to cause the web browser, before un-loading the first web page from a visible frame of the web browser, to load the second web page in a hidden frame of the web browser and then switch the visibility of the frames so that the hidden frame becomes visible and the visible frame becomes hidden.

6. The system of claim 5, wherein the active outer component, when instantiated in the web browser, is operable to:
 instantiate a new active inner component using the class name stored in the second parameter; and
 store a reference to the new active inner component in a static memory for the active outer component.

7. The system of claim 6, wherein the active outer component is further operable to:
 before instantiating the new active inner component, use the unique identifier stored in the first parameter to look for an existing active inner component; and if an existing active inner component is found, use the existing active inner component instead of instantiating a new active inner component.

8. The system of claim 5, wherein:
 the second web page includes a markup element that specifies the same active outer component as the first web page; and
 the active outer component is instantiated when the second web page is loaded.

9. A computer program product, tangibly embodied in a computer-readable storage medium, the computer program product being operable to cause a computer to perform operations comprising:

making a request to a web server for a first web page, the first web page including an active outer component;

receiving the first web page from the web server;

loading the first web page in the web browser, including creating a first instance of the active outer component, wherein the first instance of the active outer component, instantiates an active inner component;

making a request to the web server for a second web page;

receiving the second web page from the web server, the second web page including the active outer component; and before destroying the first web page, loading the second web page including creating a second instance of the active outer component, wherein the second instance of the active outer component looks for an existing active inner component and if an existing active inner component is found, uses the existing active inner component instead of instantiating a new active inner component;

wherein the first web page is loaded in a visible frame of the web browser and the second web page is loaded in a hidden frame of the web browser, and once the second web page is loaded in the hidden frame, the visibility of the frames is switched so that hidden frame becomes visible and the visible frame becomes hidden.

10. A system comprising:

means for making a request to a web server for a first web page, the first web page including an active outer component, the active outer component being a program that executes in a web browser;

means for receiving the first web page from the web server;

means for loading the first web page in the web browser, including creating a first instance of the active outer component, wherein the first instance of the active outer component, instantiates an active inner component;

means for making a request to the web server for a second web page;

means for receiving the second web page from the web server, the second web page including the active outer component;

means for, before destroying the first web page, loading the second web page including creating a second instance of the active outer component, wherein the second instance of the active outer component looks for an existing active inner component and if an existing active inner component is found, uses the existing active inner component instead of instantiating a new active inner component; and a processor for implementing at least the means for making the request to the web server, wherein the first web page is loaded in a visible frame of the web browser and the second web page is loaded in a hidden frame of the web browser, and once the second web page is loaded in the hidden frame, the visibility of the frames is switched so that hidden frame becomes visible and the visible frame becomes hidden.

11. A computer-implemented method comprising:

receiving a request from a web browser for a first web page;

sending, in response to the request, the first web page to the web browser, the first web page including:

a markup element that specifies an active outer component, the markup element including a first parameter that stores a unique identifier for an active inner component and a second parameter that identifies a class name for the active inner component, the active outer component and the active inner component being programs that execute in the web browser, and a script that is triggered when the web browser makes a request to load a second web page, the script being operable to cause the web browser, before un-loading the first web page from a visible frame of the web browser, to load the second web page in a hidden frame of the web browser and then switch the visibility of the frames so that the hidden frame becomes visible and the visible frame becomes hidden.

12. A computer-implemented method comprising:

making a request to a web server for a first web page, the first web page including an active outer component;

receiving the first web page from the web server;

loading the first web page in the web browser, including creating a first instance of the active outer component, wherein the first instance of the active outer component, instantiates an active inner component;

making a request to the web server for a second web page;

receiving the second web page from the web server, the second web page including the same active outer component as the first web page; and before destroying the first web page, loading the second web page including creating a second instance of the active outer component, wherein the second instance of the active outer component looks for an existing active inner component and if an existing active inner component is found, uses the existing active inner component instead of instantiating a new active inner component;

wherein the first web page is loaded in a visible frame of the web browser and the second web page is loaded in a hidden frame of the web browser, and once the second web page is loaded in the hidden frame, the visibility of the frames is switched so that hidden frame becomes visible and the visible frame becomes hidden.

* * * * *

UNITED STATES PATENT AND TRADEMARK OFFICE
CERTIFICATE OF CORRECTION

PATENT NO. : 7,571,219 B2 Page 1 of 1
APPLICATION NO. : 11/015618
DATED : August 4, 2009
INVENTOR(S) : Cejka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Seventh Day of September, 2010

David J. Kappos
*Director of the United States Patent and Trademark Office*